US009947485B2

(12) United States Patent
Liu et al.

(10) Patent No.: US 9,947,485 B2
(45) Date of Patent: Apr. 17, 2018

(54) THREE DIMENSIONAL ENERGY STORAGE DEVICE, METHOD OF MANUFACTURING SAME, AND MOBILE ELECTRONIC DEVICE CONTAINING SAME

(71) Applicants: Yang Liu, Santa Clara, CA (US); Priyanka Pande, Ann Arbor, MI (US); Bum Ki Moon, Santa Clara, CA (US); Michael C. Graf, Palo Alto, CA (US); Donald S. Gardner, Los Altos, CA (US); Nicolas Cirigliano, Burlingame, CA (US); Shanthi Murali, Santa Clara, CA (US); Zhaohui Chen, San Jose, CA (US)

(72) Inventors: Yang Liu, Santa Clara, CA (US); Priyanka Pande, Ann Arbor, MI (US); Bum Ki Moon, Santa Clara, CA (US); Michael C. Graf, Palo Alto, CA (US); Donald S. Gardner, Los Altos, CA (US); Nicolas Cirigliano, Burlingame, CA (US); Shanthi Murali, Santa Clara, CA (US); Zhaohui Chen, San Jose, CA (US)

(73) Assignee: INTEL CORPORATION, Santa Clara, CA (US)

( * ) Notice: Subject to any disclaimer, the term of this patent is extended or adjusted under 35 U.S.C. 154(b) by 327 days.

(21) Appl. No.: 13/929,224

(22) Filed: Jun. 27, 2013

(65) Prior Publication Data

US 2015/0003033 A1   Jan. 1, 2015

(51) Int. Cl.
*H01G 11/48*   (2013.01)
*H01G 11/26*   (2013.01)
(Continued)

(52) U.S. Cl.
CPC ............ *H01G 11/84* (2013.01); *H01G 11/26* (2013.01); *H01G 11/46* (2013.01); *H01G 11/50* (2013.01);
(Continued)

(58) Field of Classification Search
CPC .. H01M 4/04; H01M 2004/025; H01M 2/145; H01M 2/1673; H01M 4/0476;
(Continued)

(56) References Cited

U.S. PATENT DOCUMENTS

| 6,093,503 A * | 7/2000 | Isoyama | H01M 2/1094 429/121 |
| 2003/0082446 A1 * | 5/2003 | Chiang | H01M 4/04 429/209 |

(Continued)

FOREIGN PATENT DOCUMENTS

JP    2001143699 A  *  5/2001  .............. H01M 4/02

OTHER PUBLICATIONS

English translation of JP2001143699A.*

*Primary Examiner* — Sarah A Slifka
*Assistant Examiner* — Brian Ohara
(74) *Attorney, Agent, or Firm* — Finch & Maloney PLLC

(57) ABSTRACT

An energy storage device includes an electrode made from an active material in which a plurality of channels have been etched. The channels are coated with an electrically functional substance selected from a conductor and an electrolyte.

23 Claims, 9 Drawing Sheets

(51) Int. Cl.
| | |
|---|---|
| H01G 11/46 | (2013.01) |
| H01G 11/50 | (2013.01) |
| H01M 4/02 | (2006.01) |
| H01M 2/14 | (2006.01) |
| H01M 2/16 | (2006.01) |
| H01M 4/04 | (2006.01) |
| H01M 4/13 | (2010.01) |
| H01M 4/139 | (2010.01) |
| H01M 4/70 | (2006.01) |
| H01M 6/40 | (2006.01) |
| H01M 10/052 | (2010.01) |
| H01M 10/058 | (2010.01) |
| H01M 4/131 | (2010.01) |
| H01M 4/136 | (2010.01) |
| H01M 4/58 | (2010.01) |
| H01M 10/0565 | (2010.01) |
| H01G 11/84 | (2013.01) |

(52) U.S. Cl.
CPC ......... *H01M 2/145* (2013.01); *H01M 2/1673* (2013.01); *H01M 4/0473* (2013.01); *H01M 4/13* (2013.01); *H01M 4/139* (2013.01); *H01M 4/70* (2013.01); *H01M 6/40* (2013.01); *H01M 10/052* (2013.01); *H01M 10/058* (2013.01); *H01M 4/0421* (2013.01); *H01M 4/0433* (2013.01); *H01M 4/131* (2013.01); *H01M 4/136* (2013.01); *H01M 4/5815* (2013.01); *H01M 10/0565* (2013.01); *H01M 2004/021* (2013.01); *H01M 2004/025* (2013.01); *H01M 2220/30* (2013.01); *Y02E 60/13* (2013.01); *Y02T 10/7011* (2013.01); *Y02T 10/7022* (2013.01); *Y10T 29/49108* (2015.01); *Y10T 29/49115* (2015.01)

(58) Field of Classification Search
CPC .......... H01M 4/13; H01M 4/139; H01M 4/70; H01M 6/40; H01M 2220/30; H01M 10/052; H01M 10/058; H01M 4/0421; H01M 4/0433; H01M 4/131; H01M 4/136; H01M 4/5815; H01M 10/0565; H01M 2004/021; H01G 11/26; H01G 11/48; H01G 11/46; H01G 11/50
See application file for complete search history.

(56) References Cited

U.S. PATENT DOCUMENTS

| | | | |
|---|---|---|---|
| 2005/0064291 A1* | 3/2005 | Sato | H01M 4/134 429/233 |
| 2010/0209784 A1* | 8/2010 | Yamazaki | H01M 2/16 429/338 |
| 2011/0135968 A1* | 6/2011 | Kim | H01M 2/0215 429/7 |
| 2013/0136973 A1* | 5/2013 | Shenoy | H01M 4/136 429/152 |

* cited by examiner

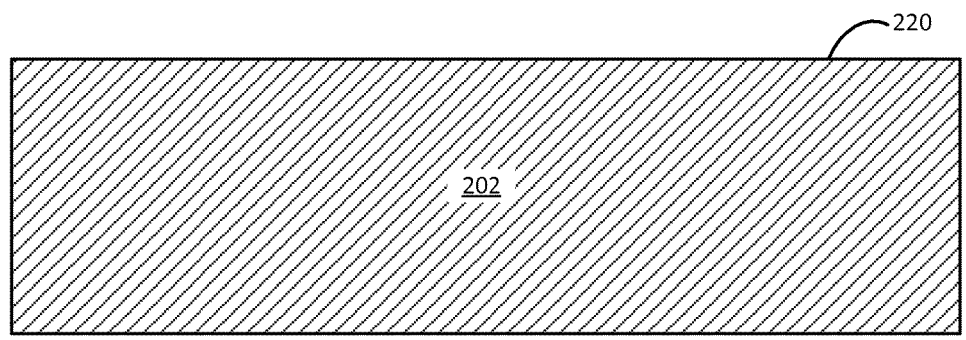
FIG. 2A
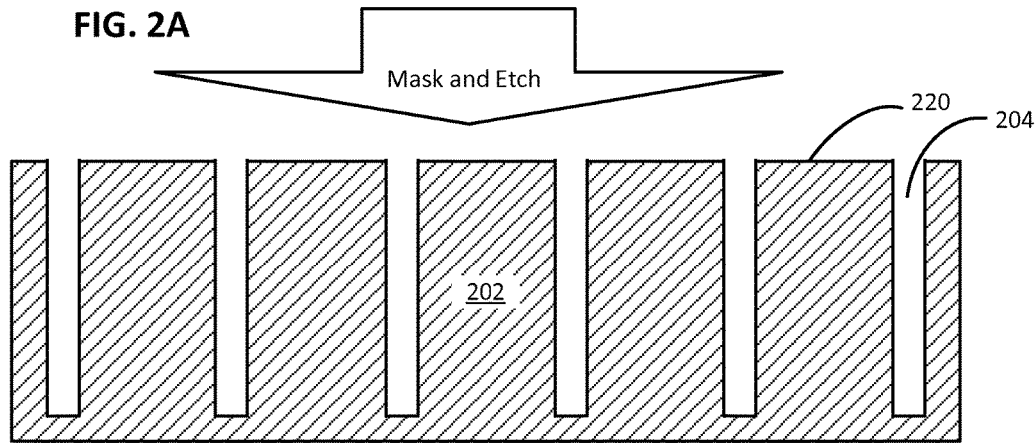
FIG. 2B
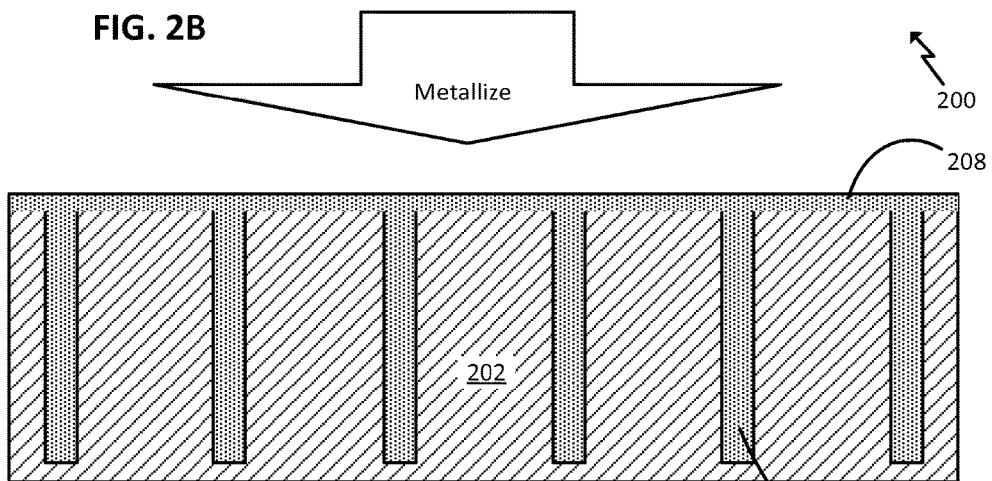
FIG. 2C

THREE DIMENSIONAL ENERGY STORAGE DEVICE, METHOD OF MANUFACTURING SAME, AND MOBILE ELECTRONIC DEVICE CONTAINING SAME

FIELD OF THE DISCLOSURE

This disclosure relates to energy storage and, in particular, to three dimensional electrochemical and electrolytic energy storage devices and their manufacture.

BACKGROUND

Modern societies depend on the ready availability of portable energy. As the demand for energy increases, devices capable of efficiently storing energy become increasingly important. As a result, energy storage devices, including batteries, capacitors, electrochemical capacitors (ECs), (including pseudocapacitors and electric double-layer capacitors (EDLCs) (sometimes called ultracapacitors, among other names)), electrolytic capacitors, hybrid ECs, and the like are being extensively used in the electronics realm and beyond. In particular, batteries and capacitors of greater power density are being demanded in consumer electronics, electric vehicles, medical devices and computing devices.

BRIEF DESCRIPTION OF THE DRAWINGS

The disclosed embodiments will be better understood from a reading of the following detailed description, taken in conjunction with the accompanying figures in the drawings in which:

FIGS. 2A through 2E illustrate the progression of the production of another embodiment of an energy storage device;

Figure 1:
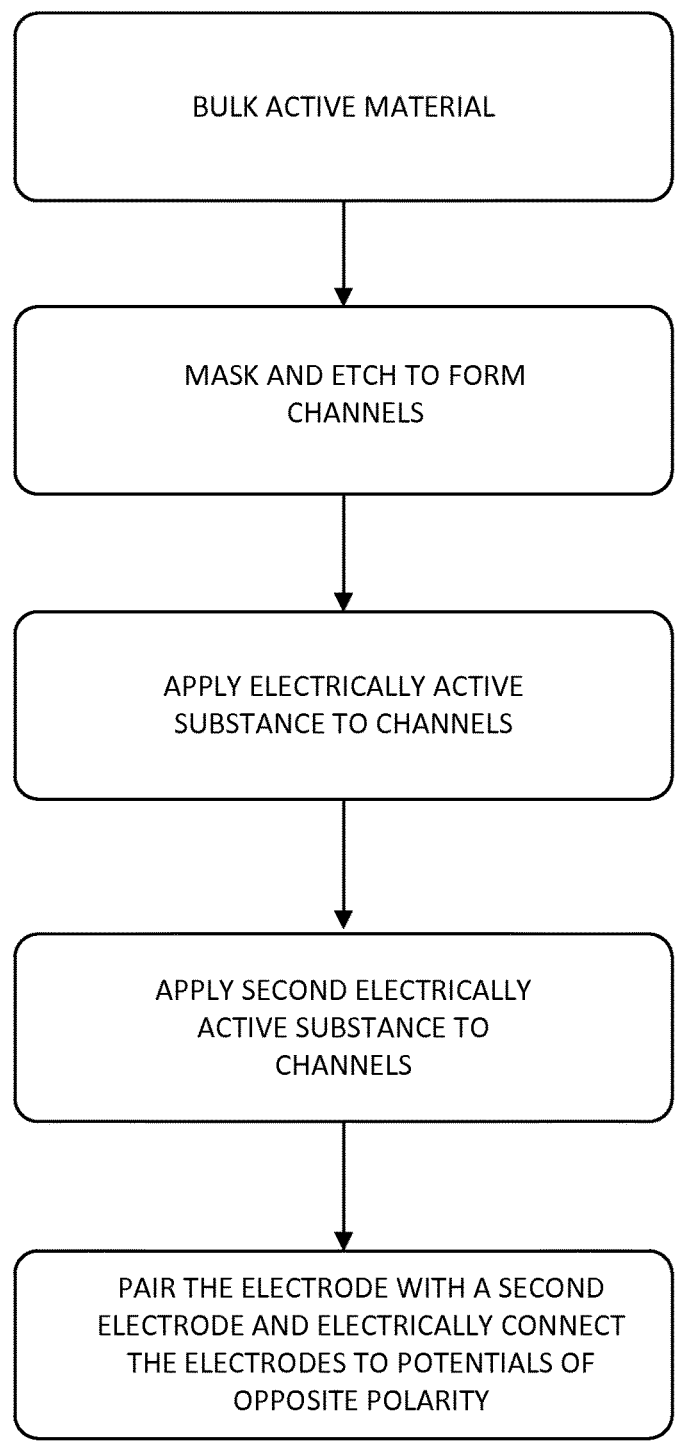
FIG. 1 provides a flow chart illustrating one embodiment of a process for producing an energy storage device.

As will be appreciated, the figures are not necessarily drawn to scale or intended to limit the present disclosure to the specific configurations shown. For instance, while some figures generally indicate straight lines, right angles, and smooth surfaces, an actual implementation of a transistor structure may have less than perfect straight lines and right angles, and some features may have surface topography or otherwise be non-smooth, given real world limitations of the processing equipment and techniques used. In short, the figures are provided merely to show example structures.

DETAILED DESCRIPTION

Three-dimensional energy storage devices are described. The devices can be manufactured using a "top-down" approach in which a bulk active material (e.g., monolith) is patterned three-dimensionally to provide an active material with a high surface area and a corresponding high power density.

An active material is a substance that can store energy chemically or electrostatically and can release that energy as electrical energy. The energy may be stored through a change in chemical state, for example, through a redox reaction. Examples of energy storage devices that can include active materials are electrodes, cells, batteries, capacitors, supercapacitors and ultracapacitors (e.g., using double-layer capacitance or pseudocapacitance). Many active materials are solids and can be in the form of a homogeneous solid monolith. They may be, for example, amorphous or crystalline materials, porous or nonporous, and in some embodiments may be cathode active materials or anode active materials. Active materials may be pure materials, doped materials, or a mixture of materials. Appropriate compounds for active materials can include, for example, organic compounds or inorganic compounds such as metal oxides and alkali metal oxides. Inorganic materials include, for example, cationic elements such as alkali metals, alkali earth metals and transition metals. For instance, the compounds may include lithium, magnesium, manganese, ruthenium, niobium, zirconium, hafnium, yttrium, aluminum and/or tantalum. A sample of specific compounds that can serve as active materials include $LiCoO_4$, $LiFeO_4$, $LiMnO_2$, $Mg_xMo_3S_4$, $MgMnO_2$ and $MgCo_2O_4$ for battery applications; $MnO_2$, $RuO_2$, $Nb_2O_5$ and conductive polymers for electrochemical capacitors; and high-k dielectrics such as $ZrO_2$, $HfO_2$, $Y_2O_3$, $Al_2O_3$, and $Ta_2O_5$ for electrolytic capacitors.

Energy storage devices include devices capable of storing energy for later use. Energy storage devices include, for example, batteries, electrochemical capacitors, electrolytic capacitors, hybrid electrochemical capacitors, fuel cells, and similar devices that store energy. Energy storage devices according to embodiments of the present disclosure can be used for a wide variety of applications, including in personal computers (PCs), including desktop and laptop (notebook) computers, tablet computers, cell phones, smart phones, music players, servers, other electronic devices, automobiles, buses, trains, airplanes, other transportation vehicles, home energy storage, storage for energy generated by solar or wind energy generators especially energy harvesting devices and many others.

Electrochemical capacitors operate according to principles similar to those that govern conventional parallel plate capacitors, but certain important differences do apply. One significant difference concerns the charge separation mechanism. For one important class of ECs this typically takes the form of a so-called electric double layer, or EDL, rather than the dielectric of a conventional capacitor. The EDL is created at an interface between an electrolyte and a high-surface area electrode by the electrochemical behavior of electrons (or electronic holes) on one side of the interface and ionic charge carriers on the other side, and results in an effective separation of charge in spite of the fact that the two layers within the double layer are so close together. (Physical separation distances are on the order of a single nanometer.) Thus, a typical EDL capacitor may be thought of as storing charge in its EDL. Each layer of the EDL, which is formed when a voltage is applied across the interface, is electrically conductive—conduction is performed by ions in the electrolyte and by electrons/holes in the electrode—but the properties of the double layer prevent current from flowing across the boundary between them.

As is true in conventional capacitors, capacitance in an EDL capacitor is proportional to the surface area of the electrodes and inversely proportional to the charge separation distance. The very high capacitances achievable in an EDL capacitor are due in part to the very high surface area attributable to the multi-channel porous structure and to the nanometer-scale charge separation distance attributable to the EDL, which arises due to the presence of an electrolyte, as explained above. One type of electrolyte that may be used in accordance with some embodiments is an ionic liquid. Another is an electrolyte comprising an ion-containing solvent. Organic electrolytes, aqueous electrolytes, and solid-state electrolytes are also possible.

Another class of electrochemical capacitor is the pseudocapacitor, where, in addition to EDL capacitance, an additional storage mechanism—one that is Faradaic and not electrostatic in origin—can arise at the surface of certain types of electrodes. The additional storage mechanism is typically referred to as "pseudocapacitance," and is characterized by a charge storage process that is similar to the operation of many solid-electrode batteries. The two storage mechanisms complement each other, leading to even greater energy storage potential than is possible with EDL capacitance alone. Typically, one of the electrodes of a pseudocapacitor is coated with a transition metal oxide, a suitable conducting polymer, or a similar material that makes up the active material where charge is stored. These materials can be used with an electrolyte such as a potassium hydroxide (KOH) solution; when the device is charged, the electrolyte will react with the material and drive a charge transfer reaction where energy is stored. More specifically, these materials store most of their energy through highly-reversible surface and near-surface electron transfer (e.g., redox (Faradaic)) reactions, which enable higher power than bulk storage in conventional batteries due to the fast charge and discharge kinetics.

It will be understood that pseudocapacitors may be constructed using electrolytes other than the one mentioned above. For example, ion-containing solvents such as $Li_2SO_4$ or $LiPF_6$ may be used as the electrolyte; these result in an intercalation reaction that involves the insertion of a species into the surface of the host structure without breaking any bonds. This reaction, like the other pseudocapacitive reactions mentioned earlier, results in a transfer of charge so it too is Faradaic and considered a redox reaction, albeit a special type of redox reaction.

Hybrid electrochemical capacitors are energy storage devices that combine the attributes of ECs and batteries. In one example, an electrode coated with a lithium ion material is combined with an electrochemical capacitor in order to create a device that has an EC's rapid charge and discharge characteristics and a battery's high energy density. On the other hand, hybrid ECs, like batteries, have shorter expected lifespans than do electrochemical capacitors.

The top-down manufacturing technique described herein can include removing active material from an active material substrate in one or more patterns to produce one or more three-dimensional patterns that can greatly increase the available surface area of the substrate. The active material may be patterned to include, for example, ion transport channels, electron transport channels and current collectors. The formation of these patterns can increase the area of contact of the active material by, for example, a factor of greater than 2, greater than 10, greater than 100 or greater than 1000. This means that in some embodiments the area of contact between active material and current collector or active material and ion channels can be greater than in traditional architectures. For instance, an active material monolith having a total surface area of "A" can be patterned to form an electrode that has an area of contact between active material and ion channels (or current collectors) of greater than A, greater than 2A or greater than 5A.

As used herein, a substrate or an energy storage device can have a length, width and thickness wherein the length is the longest dimension through the device or substrate, the width is the longest distance through the device or substrate that is perpendicular to the length, and the thickness (height) is the average distance across the device or substrate measured along an infinite number of lines perpendicular to the length and width. The volume of a substrate or device is defined as length multiplied by width multiplied by thickness. To compare the surface area of an electrode or other active material before and after patterning, the surface area can be measured or calculated by measuring the overall surface dimensions, including the surfaces of any features, such as channels. If the surface area of an active material such as an electrode was not evaluated prior to the formation of features, its original surface area can be accurately determined by calculating what the surface area of the material would be with all of the patterned voids filled with active material.

In some embodiments an active material substrate may be formed from pastes, dispersions or inks, and may be printed using screen printing, ink jet printing or other 3-D printing techniques. These liquids, dispersions, or pastes may then be solidified via polymerization, crystallization, drying, sintering and/or annealing. Using these techniques, active material substrates can be formed in desired shapes and can be formed with a pattern in the substrate prior to, or in the absence of, removal of material from the substrate. The active material and/or the energy storage device can be flexible, but in many cases may be rigid. For instance, in various embodiments the active material and/or the energy storage device may have a Young's modulus of greater than 10 GPa, greater than 20 GPa, greater than 50 GPa or greater than 100 GPa.

Using a "top-down" approach to energy device manufacturing, many process embodiments described herein begin with an active material substrate from which a pattern of active material is removed to increase the surface area of the substrate. Even after removal of material, the active material substrate can retain its integrity and can remain a single, integral piece of active material. In many embodiments, portions of active material can be removed in one or more patterns to increase surface area and to provide surfaces and/or pathways for components such as current collectors, ion channels and electron channels. Material can be removed from the active material substrate so that the mass of active material remaining after removal is less than 90%, less than 70%, less than 50% or less than 30% of the mass of the substrate prior to processing. A pattern is a pre-determined, man-made, arrangement of a three dimensional feature or features on a substrate. Patterns may be regular patterns, may be geometric and may be non-random, such as an array. A pattern may be repetitive and may include a plurality of the same features in a geometric arrangement. A pattern is not found naturally in an active material but is formed using a man-made process. Two or more patterns can be formed in a single active material substrate.

In some embodiments, patterns can be produced by an anisotropic etching process such as, for example, wet etching, deep reactive-ion etching, metal assisted etching or ion-beam milling. Wet etching can include processes used to etch silicon wafers during microfabrication processes. The substrate may be masked with a photoresist or other substance and can be patterned using photolithography. The substrate can then be anisotropically etched to form a pattern of features. Deep reactive-ion etching (e.g., plasma etching) can be applied in a manner similar to the methods used to produce capacitor trenches in memory circuits or in MEMS applications. Ion-beam milling can be used to directly carve a pattern of features into a substrate of active material. In many of these processes a mask is not required.

A pattern's features may be geometric, and features, in cross-section, may be, for example, round, oval, square, triangular, rectangular or polygonal. In many embodiments, the features are regularly shaped and either do not vary in width or only vary in width consistently along the feature. Pattern features may be either negative features or positive features. Negative features are those areas where voids are formed by removing material or by the absence of material. Examples of negative features are spaces, channels, holes and gaps. Positive features remain after active material has been removed from around the feature and positive features are defined by the space or spaces around the feature. Examples of positive features include posts walls, cylinders, hemispheres and cones. As used herein, the height (or depth) of a feature is it dimension in a direction substantially normal to the major plane of the substrate. The width of feature is measured in a direction substantially parallel to the major plane of the substrate. In the case of a channel, for example, the width is measured across the channel from wall to wall. In various embodiments, pattern features can exhibit different aspect ratios and may have height to width ratios, or average height to width ratios, of $\geq 0.25$, $\geq 0.5$, $\geq 1.0$, $\geq 2.0$, $\geq 5.0$, $\geq 10.0$ or $\geq 25.0$. As used herein, an aspect ratio is the ratio of the depth to width of a channel (or other negative space) or the ratio of height to width of a positive feature. Features are typically well-defined and a feature can be detected outside the noise of an uneven substrate surface. For example, a feature may have an aspect ratio that is greater than 2×, greater than 5× greater than 10× or greater than 100× the height to width ratio of any inherent surface variations in the active material substrate. In various embodiments, features can be on a millimeter, micrometer or nanometer scale. For example the average height (depth) or width of a feature (e.g., channel, wall or post) can be <5 mm, <1 mm, <100 µm, <10 µm, <1 µm, <100 nm or <10 nm. In specific embodiments, features may have a dimension (i.e., average height (depth), width or length) in the range of 0.1 to 1 mm, 1 to 100 µm, 10 to 100 µm, 1 to 10 µm, 10 nm to 1 µm or 10 nm to 100 nm. Channel walls may be vertical and channel widths may be consistent from top to bottom. Widths may also increase or decrease in the channel from top to bottom or bottom to top. In some embodiments, walls, such as channel walls, may be as much as +/−45°, +/−20°, +/−10°, +/−5° or +/−2° from vertical and may slope inwardly or outwardly from top to bottom.

In one set of embodiments, energy storage devices can be formed from a single, solid monolith of active material. A flow chart of an example process from one embodiment is provided in FIG. 1. Using a top-down approach, the starting substrate is a bulk active material from which material will be removed to produce a three dimensional pattern. The bulk active material is first masked to form a one dimensional pattern of channels or other features that are to be patterned into the active material. The material is then etched to remove active material and form voids that are separated by walls of active material. An electrically functional substance, such as a conductor or an electrolyte, is then applied to the walls of one or more channels and may completely fill some of the channels. Electrically functional substances are those substances that can promote or inhibit the conversion of chemical energy to electrical energy in an energy storage device. An electrically functional substance can form, for instance, a current collector, an electron channel or an ion channel. Optional second, third and additional electrically functional substances can then be added to one or more different channels. For instance, a second set of channels formed on an opposed side of the active material monolith can receive a second electrically functional substance. In this manner, one set of channels may include a current collector and a second set of channels may function as ion channels. The electrode may then be paired with a counter electrode and each of the electrodes can be electrically connected to a potential.

Energy Storage Device Production Methods—

FIGS. 2A-2D illustrate stages of a process that can be used to produce one embodiment of an energy storage device, in this embodiment, electrode 200. In this process, portions of active material are removed from an active material substrate to produce an electrode including ion channels and current collectors. Active material may be removed using, for example, lithography or other masking and etching processes. To begin, electrode 200 is produced by etching planar active material substrate 202 to produce one or more channels 204 which are shown in transverse cross-section in FIG. 2B. In the embodiment illustrated, channels 204 are similarly sized, are parallel to each other, and are evenly spaced. A perspective view of electrode 200 is shown in FIG. 2E. In other embodiments, channels may vary in size, orientation and/or spacing. Adjacent channels may be parallel or non-parallel and the thickness of the active material between two channels may be less than, equal to, or greater than the width of the channels. As used herein, two or more channels are "substantially parallel" to each other if they are less than 5° out of alignment. Non-linear channels, such as curved channels, may also be considered "substantially parallel" if they are of the same shape and the distance between them remains constant along the length of the channels.

In one embodiment, the substrate may be a $LiCoO_2$ substrate that is patterned using silver to expose those areas in which channels 204 are to be formed. Channels 204 can then be anisotropically etched into the substrate using HF. The silver or other HF resistant mask may be applied in a pattern using, for example, chemical vapor deposition or printing, such as screen printing or ink jet printing. The resulting channels 204 may have high aspect ratios such as 5:1 or 10:1. As shown, channels 204 are etched about 90% through the active material substrate, but in some embodiments, the channels may be etched entirely through the substrate to allow for more efficient metallization (see below). To prevent electrical shorting, when a process that etches completely through is used, later applied conductive materials can be isolated by oxidizing or coating with an insulating material.

As shown in FIG. 2C, electrode 200 includes conductive current collectors 206 and 208 which may be formed by applying conductive material to channels 204 as well as surface 220. Example processes include metallization. Conductive materials including metals such as tungsten, aluminum, copper and silver can be applied to channels 204 using methods such as, for example, atomic layer deposition (ALD), chemical vapor deposition (CVD), electrochemical deposition (ECD), supercritical flow growth, or a combination of any of these processes. One combination is to start with a process such as CVD or ALD that can coat a seed layer on all exposed surfaces and then, once a conductive layer is formed, ECD can be used to fill the channels quickly with larger quantities of conductive material. Conductive current collector 208 is substantially parallel to the major surfaces of the active material and is in direct contact with current collector 206 which is at approximately right angles with respect to current collector 208. The two current collectors 206 and 208 are in direct contact, contiguous, and may be formed using a single continuous process or in separate processes.

In another method for applying conductive layers, channels 204 can be physically coated or filled with a conductive powder, gel or liquid using, for example, solution casting, spin coating or vacuum casting/drying techniques. Conductive powders may include, for example, inorganic materials such as metal powders and organic materials such as carbon black or graphite. Pressure or vacuum may be applied in some embodiments. In some cases, the conductive material may be introduced to channels 204 as a liquid and may then be converted to a gel or solid once the channels have been filled. Solvents may be removed by drying using for example, heat, vacuum or supercritical drying techniques. Any solvents used should be able to wet the surfaces of channels 204 and in many cases will exhibit very low surface energy. Wetting agents and surfactants may be added, and the channel walls may also be pretreated, for example by altering the surface chemistry of the channels to render the channel walls more compatible with the solvent being used. For instance, a surfactant may be applied to render the walls of channels 204 more or less hydrophobic, depending on whether a non-aqueous or aqueous system is being used.

In another embodiment of applying conductive layers, channels 204 may be filled with a polymer that is subsequently converted to a conductive material. For example, channels 204 may be filled with a polymer or pre-polymer using vacuum casting, and the polymer or pre-polymer can subsequently be polymerized and rendered conductive. For example, channels 204 may be cast with SU 8 which can then be converted to a conductive material, e.g., glassy carbon, using pyrolysis.

Figure 2D:
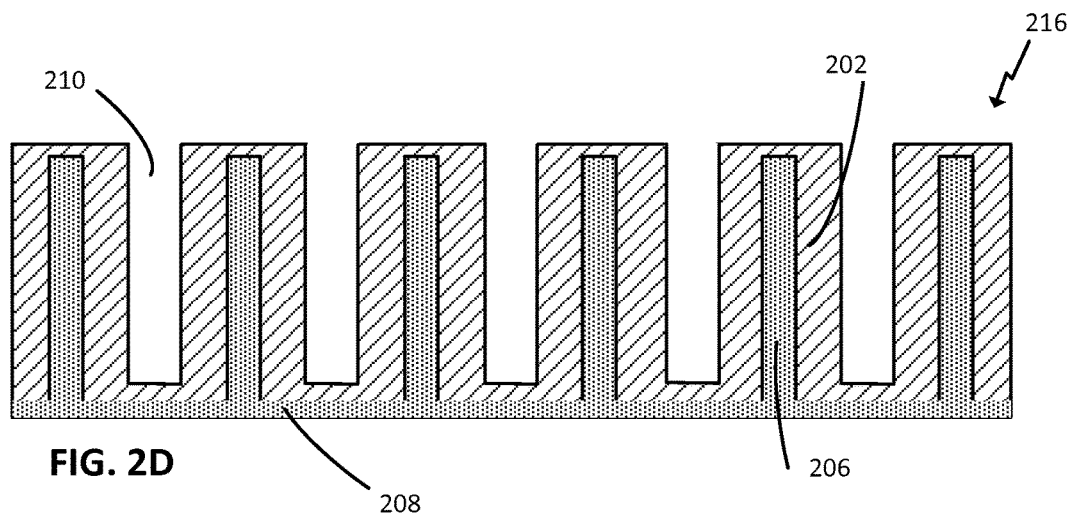
Figure 2E:
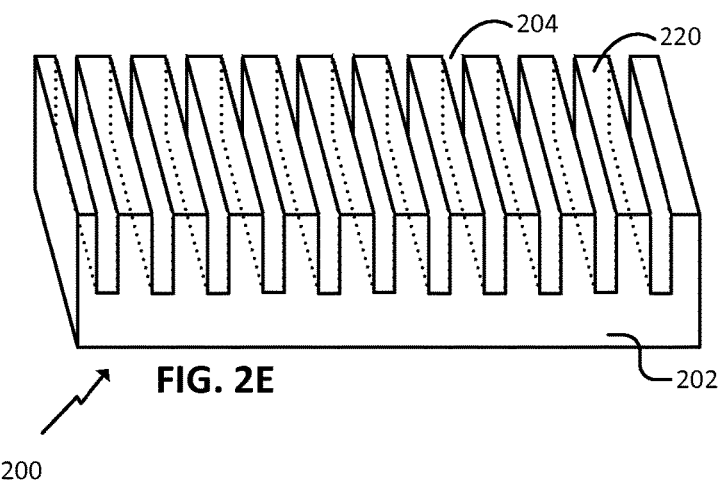

FIG. 2D illustrates the result of a second masking and etching process in which opposed channels 210 are formed in active material 202 to make device 216. Opposed channels 210 can be formed using the same techniques as used to form channels 204, although alternative methods may also be used. As shown in FIG. 2D, substrate 202 has been flipped 180° so that current collector 208 now faces downwardly. In the embodiment shown, opposed channels 210 are etched from the surface of active material 202 that is opposed to the surface through which channels 204 have been etched. Opposed channels 210, as shown, are parallel to each other and to channels 204, are spaced equally, and are centered between a pair of channels 204. In different embodiments, opposed channels 210 may extend through greater than 50%, 75%, 90% or 95% of the thickness of active material 202. Opposed channels 210 can be, for example, ion channels or a second current collector and may be filled, or partially filled, with conductive material or with an electrolyte. Materials may be applied to opposed channels 210 using methods similar or identical to those used to fill channels 204. In one set of embodiments, channels 204 form a current collector and opposed channels 210 form ion channels.

Figure 3A:
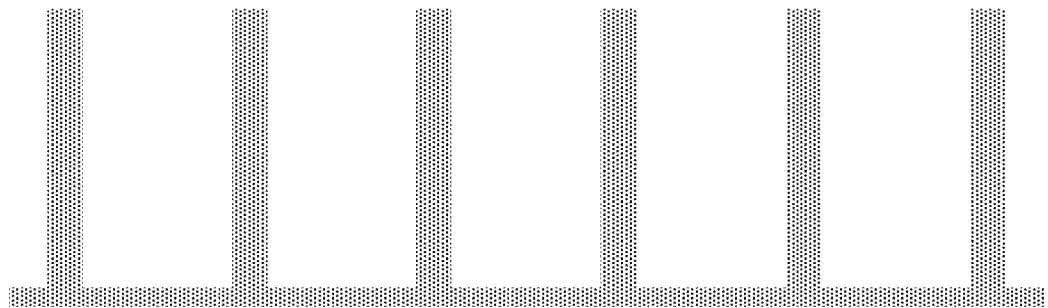
FIGS. 3A through 3C illustrate the progression of the production of an energy storage device using an embodiment that is a hybrid of top down and bottom up approaches.
Figure 3B:
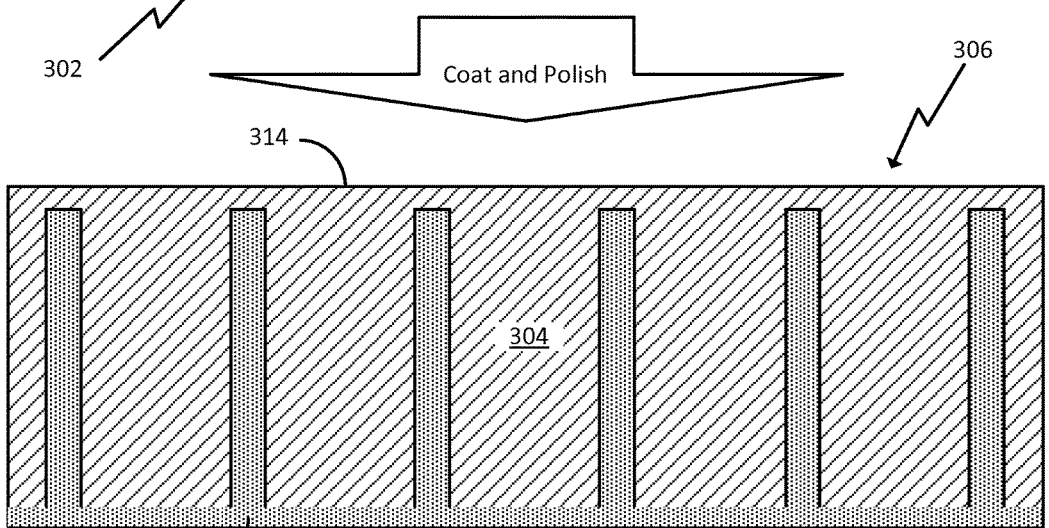
Figure 3C:
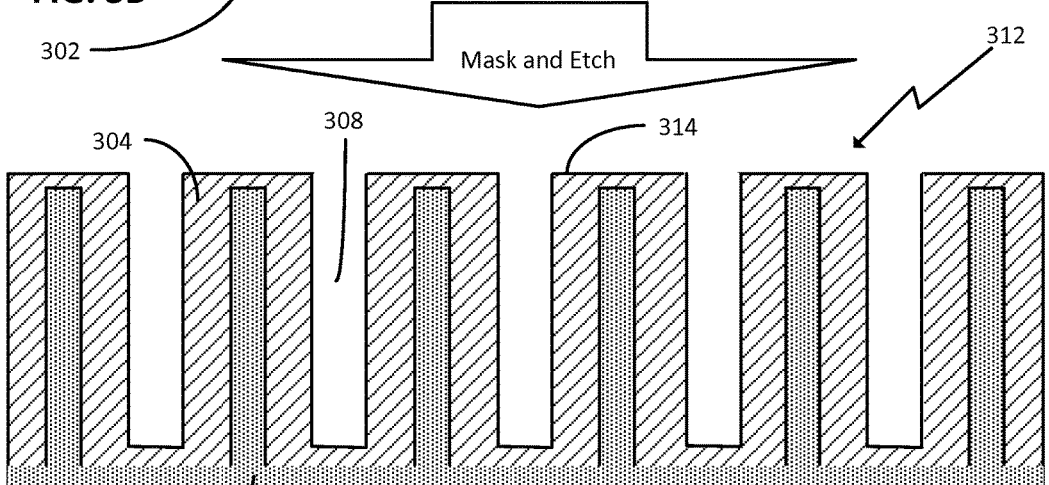

FIGS. 3A through 3C illustrate a process of producing an embodiment of an energy storage device using a combination of top-down and bottom up technology. FIG. 3A shows a cross-section of a conductive current collector array 302. This current collector array 302 may be organic, inorganic or a combination of both, and may include, for example, aligned conductive nanotubes, rods or wires. Collector array 302 may be free standing and can be made using a variety of methods including molding, machining, extruding and deposition techniques. To proceed to electrode 306 shown in cross-section in FIG. 3B, active material 304 can be deposited (bottom up) onto collector array 302 using methods such as, for example, ECD techniques including electroplating and hydrothermal growth. Upper surface 314 can, if necessary, be planarized by, for example, polishing surface 314 using chemical-mechanical planarization (CMP) techniques. Additional electrode surfaces may also be planarized or shaped using similar or identical processes. The structures shown in FIGS. 3B and 2C may be substantially the same although they can be made using very different techniques, in particular a top-down approach (FIG. 2C) and a bottom-up approach (FIG. 3B). Electrode 312, shown in FIG. 3C, can be produced using the same top-down method as that described above to produce device 216 as shown in FIG. 2D. For example, surface 314 can be masked and etched anisotropically to produce channels 208.

Figure 4:
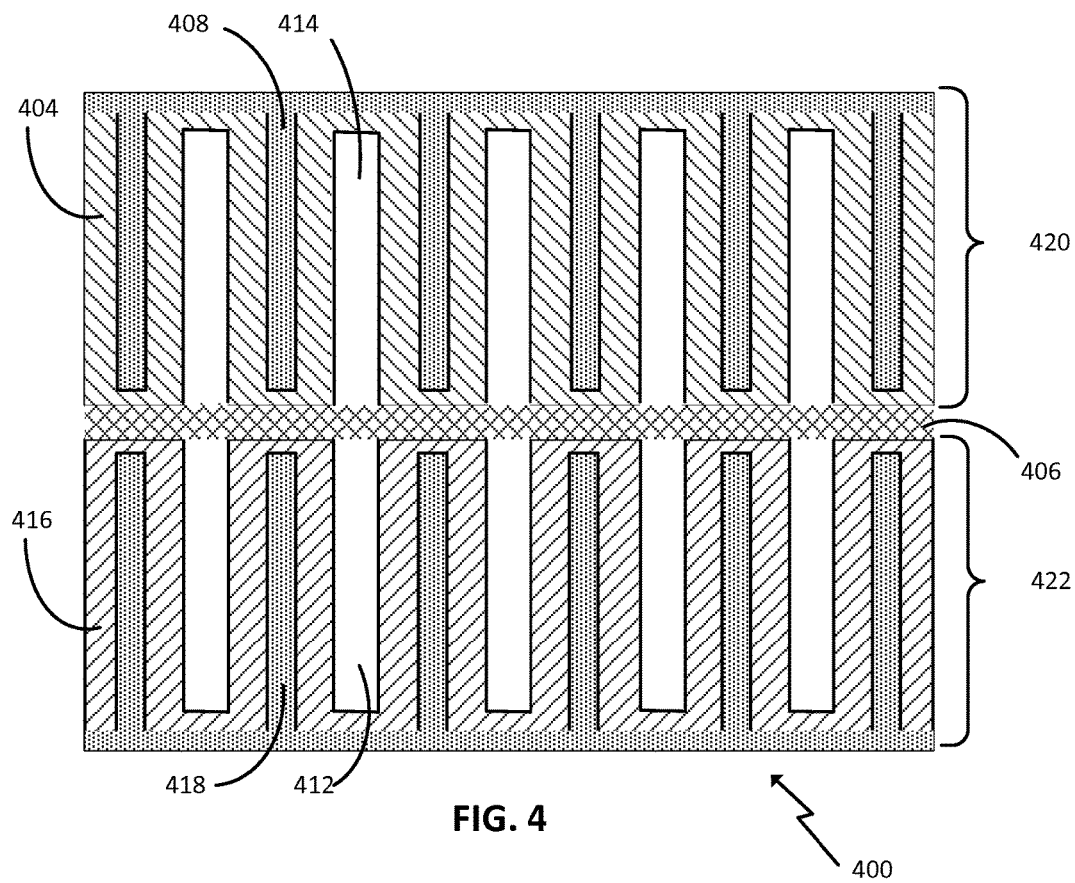
FIG. 4 provides a cross-section view of an embodiment of an energy storage device.

FIG. 4 provides a cross-sectional view of a battery 400 that can be made by combining two of the electrodes described in the embodiments above. In the embodiment shown, electrode 420 is joined to electrode 422 via battery separator 406. Electrode 420 includes active material 404, current collector 408 and ion channels 414. Ion channels 414 may be filled, or partially filled, with an electrolyte such as a gel or liquid electrolyte. Electrode 422 includes active material 416 which may be the same as or different from active material 404. Electrode 422 also includes current collector 418 and ion channels 412. The current collectors and ion channels in each of the opposed cells may be the same or different. Battery separator 406 can be any material that prevents electrodes 420 and 422 from contacting while allowing the transport of ions. Appropriate examples include polymeric and ceramic separators. Each of electrodes 420 and 422 can be the same (symmetric cell) or they may have different structures, different compositions or both (asymmetric cell).

Figure 5:
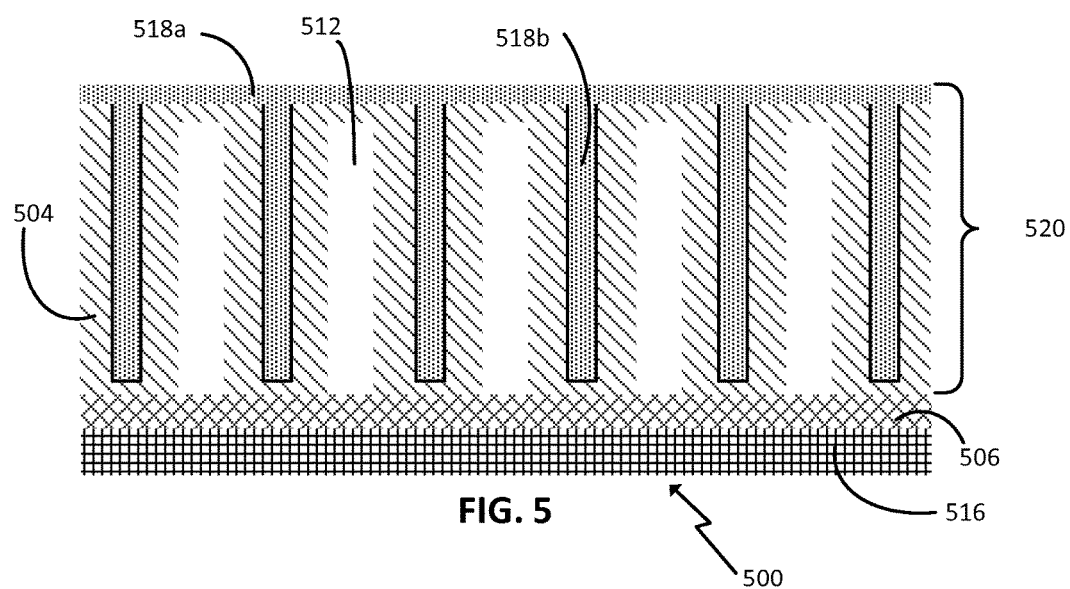
FIG. 5 provides a cross-sectional drawing of another embodiment of an energy storage device.

An embodiment of an asymmetric cell 500 is provided in FIG. 5. FIG. 5 provides a cross-sectional view of battery 500 that includes electrode 520, separator 506 and porous electrode 516. Electrode 520 includes active material 504, current collectors 518a and 518b and ion channels 512. As in FIG. 4, ion channels 512 can be filled or partially filled with an electrolyte such as a gel electrolyte or fluid electrolyte. Porous electrode 516 is in contact with separator 506 along its entire surface. As in many other embodiments, the current collector comprises a continuous, integral conducting material, such as a metal, and includes multiple planar portions including planar portion 518a and planar portion 518b. Current collector portion 518a, as shown, is substantially in a horizontal plane while current collector portion 518b is substantially in a vertical plane. Therefore, the current collector includes multiple planar portions and at least two of those portions (518a and 518b) can be normal (at right angles) to each other. This configuration can provide for a greatly increased area of contact between active material 504 and current collectors 518a and 518b. The area of contact can be more than 2×, 5× or 10× the surface area of portion 518a alone.

Figure 6A:
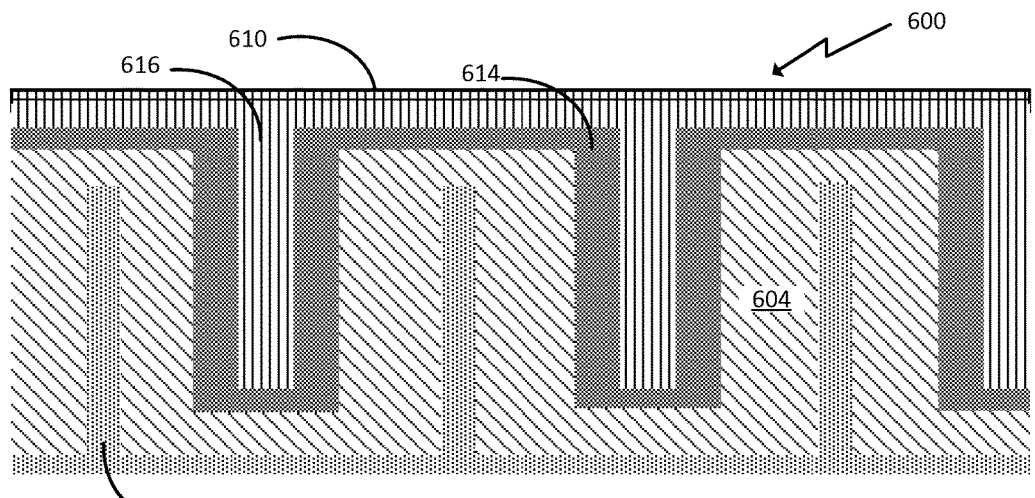
FIGS. 6A and 6B provide a cross-sectional schematic of one embodiment of an energy storage device at different stages of production.
Figure 6B:
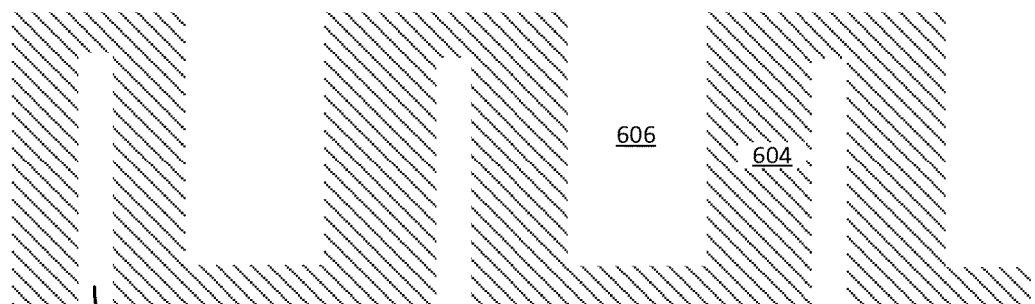
Figure 7:
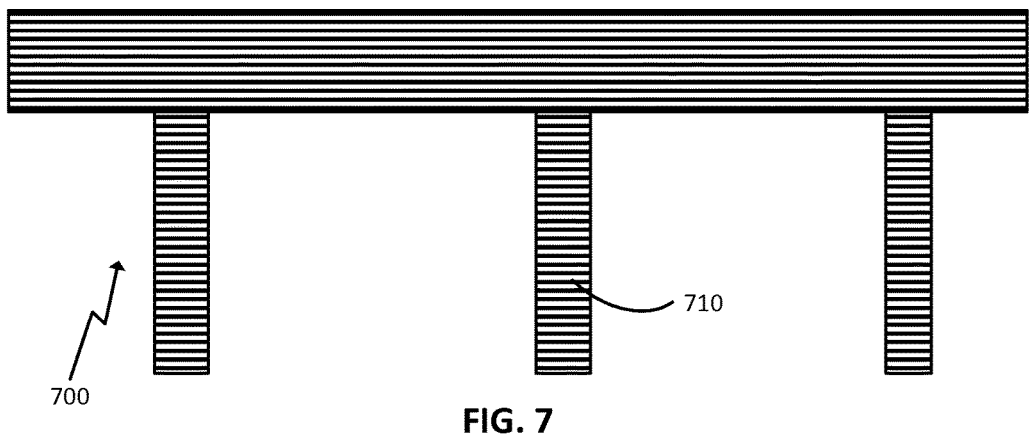
FIG. 7 provides a cross-sectional drawing of a mold used to produce one embodiment of an energy storage device.

Another embodiment of an energy storage device is provided in the schematic illustrations of FIGS. 6A and 6B as well as FIG. 7. Energy storage device 600 includes active material 604, counter electrode 608, and gel electrolyte 614. Also included is second active material forming electrode 616, portions of which fill channels in gel electrolyte 614. Second current collector 610 is in contact with an upper planar surface of electrode 616. A top-down process can be used to make energy storage device 600, and to begin, a monolith of active material 604 can be masked and etched, as described earlier, to produce two series of parallel channels in active material 604, as shown in FIG. 6B. A first set of etched channels 602 can be filled with conductive material using any of the methods previously described herein to produce current collector 608. A second set of etched channels 606 can function as ion channels and in this case are wider than first set 602. Etched channels 606 can be coated or filled with a solid state electrolyte to produce ion channels 614. A solid state electrolyte can be applied, for example, by solution-casting a polymer electrolyte gel into ion channels 606 and pressing the polymer gel with a mold. An example of a mold 700 is provided in FIG. 7. Mold 700 can be made of any solid, compatible material such as metal or polymer and may be flexible or rigid. For example, the mold can be a metal post array in which posts 710 are spaced to align with the centers of ion channels 606. A solid state electrolyte can be polymerized with the mold posts inserted into ion channels 606, and mold 700 can then be withdrawn from ion channels, leaving a negative void that is the same shape and size as posts 710. These voids can then be filled with a second active material to produce second electrode 616 (FIG. 6A). For example, active materials such as carbon, metal or an anode material such as, for example, Si, $SnO_2$, $TiO_2$, $Nb_2O_5$ can be applied to the solid state electrolyte using techniques such as mold pressing, solution casting, or physical/chemical vapor depositions. These materials may also be mixed with conductivity additives to improve electrical conductivity and with binders to improve the integrity of the second electrode. Current collector 610 can then be applied to second electrode 616 using, for example, CVD. This three dimensional structure can provide for high surface areas of energy storage device components such as active materials, current collectors and ion channels. In the same structure, the size and outer surface area of the battery itself can be extremely compact.

Figure 8A:
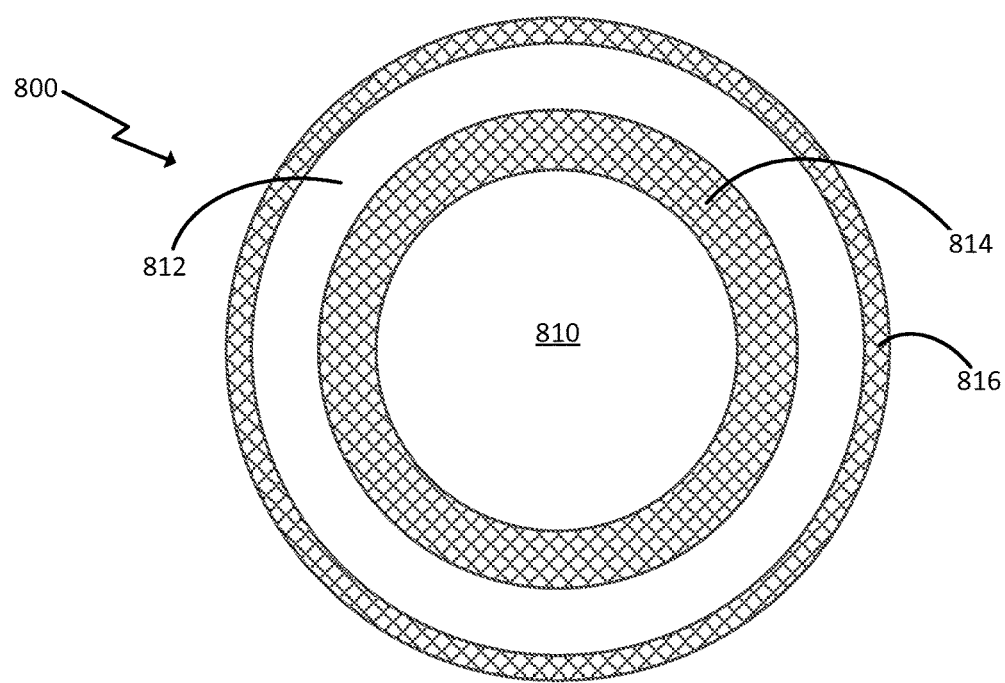
FIGS. 8A and 8B provide cross-sectional and perspective views respectively of another embodiment of an energy storage device.
Figure 8B:
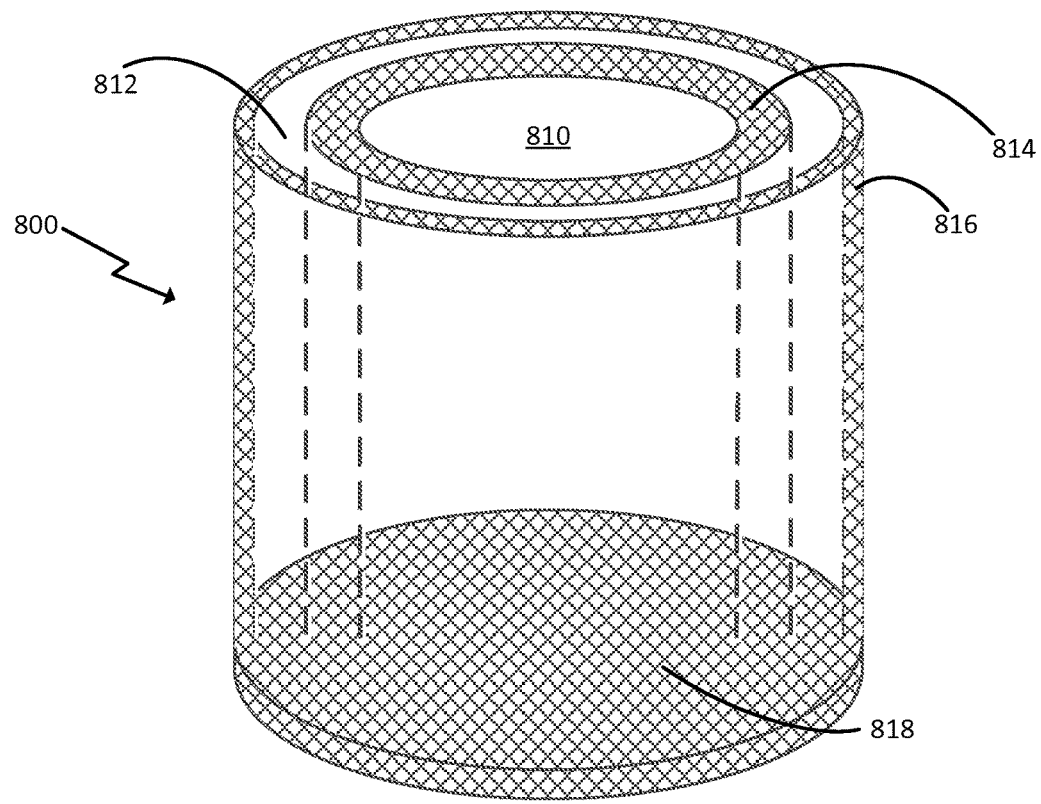

FIGS. 8A and 8B provide end (FIG. 8A) and perspective (FIG. 8B) views of coaxial energy storage device 800. Using a top down approach, a solid cylinder of active material can be etched to leave annular voids 810 and 812 and a solid disk shaped base of active material 818. In some embodiments, shaped base 818 may be contiguous with and may be formed from the same monolith as coaxial cylinders 814 and 816. Annular, cylindrically shaped voids 810 and 812 may be filled, together or independently, with electrically functional substances to function as a current collector, a separator, an electrolyte and/or a second active material. Methods identical to or similar to the methods made to produce the energy storage device shown in FIG. 6A may be used. In other embodiments, cylinders 814 and 816 may be isolated from each other, for example, by etching completely through base 818 so that base 818 is either never formed or is removed from the structure. In some cases, base 818 can be removed after voids 810 and/or 812 have been filled will other materials. These materials may include, for example, current collectors, electrolyte, separator material or an electrolyte/ active material second electrode. Removal of base 818 may be done physically or chemically or by a combination thereof. These methods may include, for example, machining, chemical dissolution, chemical-mechanical polishing or planarization.

Figure 9:
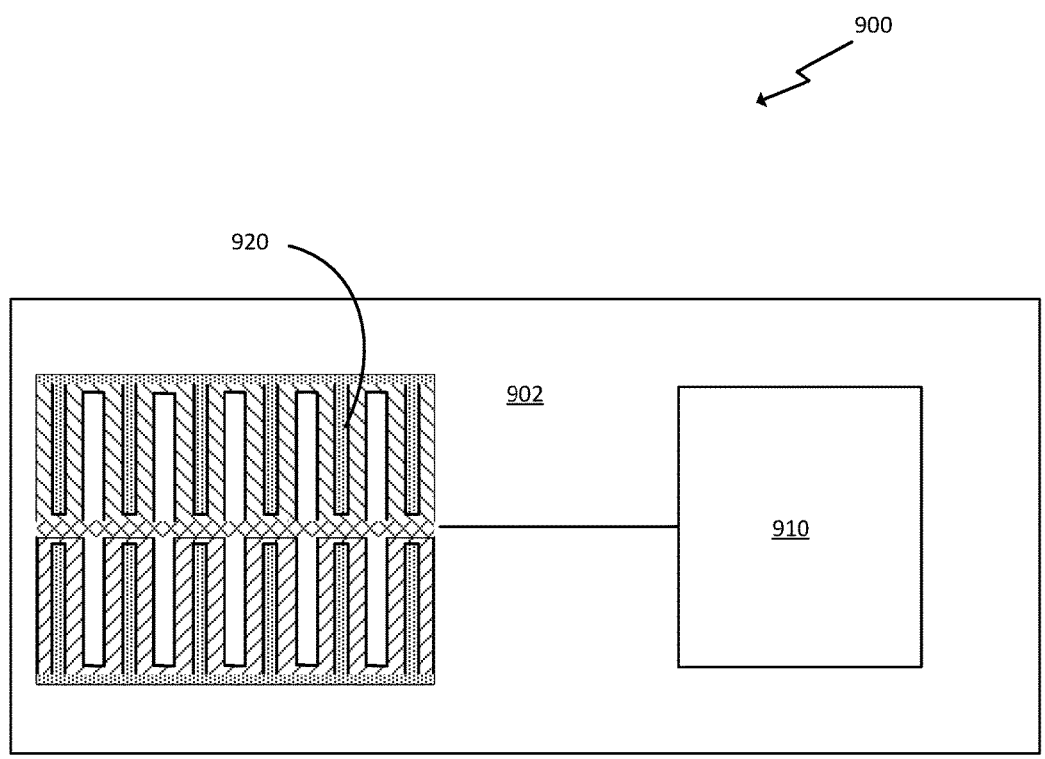
FIG. 9 provides a schematic illustration of one embodiment of a mobile electronic device including an energy storage device.

In one embodiment, an energy storage device like those described herein can be used as part of a mobile electronic device such as a cell phone, a smart phone, a music player (or another hand-held computing system), a laptop, a nettop, a tablet (or another mobile computing system), or the like. FIG. 9 is a schematic representation of a mobile electronic device 900 according to an embodiment. As illustrated in FIG. 9, mobile electronic device 900 comprises a housing 902, an integrated circuit (IC) die 910 within the housing, and an energy storage device 920 within housing 902 and associated with IC die 910 so as to be capable of providing energy to the IC die. In some embodiments, being "associated with" IC die 910 means energy storage device 920 is integrated into IC die 910 or its packaging in some fashion (e.g., by being implemented on the die itself; by forming part of a Package-on-Package (PoP) architecture or a system-on-chip (SoC) architecture; etc. As an example, energy storage device 920 can be similar to energy storage device 400, described above and shown in FIG. 4. It should be understood, however, that the depictions in the figures of energy storage devices 400 and 920 are potentially incomplete in that they omit certain details that would likely, or at least possibly, be present in a finished device. These potentially include one or more collectors attached to particular electrodes as well as various packaging components.

IC die 910 may comprise any type of integrated circuit device. In one embodiment, IC die 910 includes a processing system (either single core or multi-core). For example, the IC die may comprise a microprocessor, a graphics processor, a signal processor, a network processor, a chipset, etc. In one embodiment, the IC die comprises a system-on-chip (SoC) having multiple functional units (e.g., one or more processing units, one or more graphics units, one or more communications units, one or more signal processing units, one or more security units, etc.). However, it should be understood that the disclosed embodiments are not limited to any particular type or class of IC devices.

Figure 10:
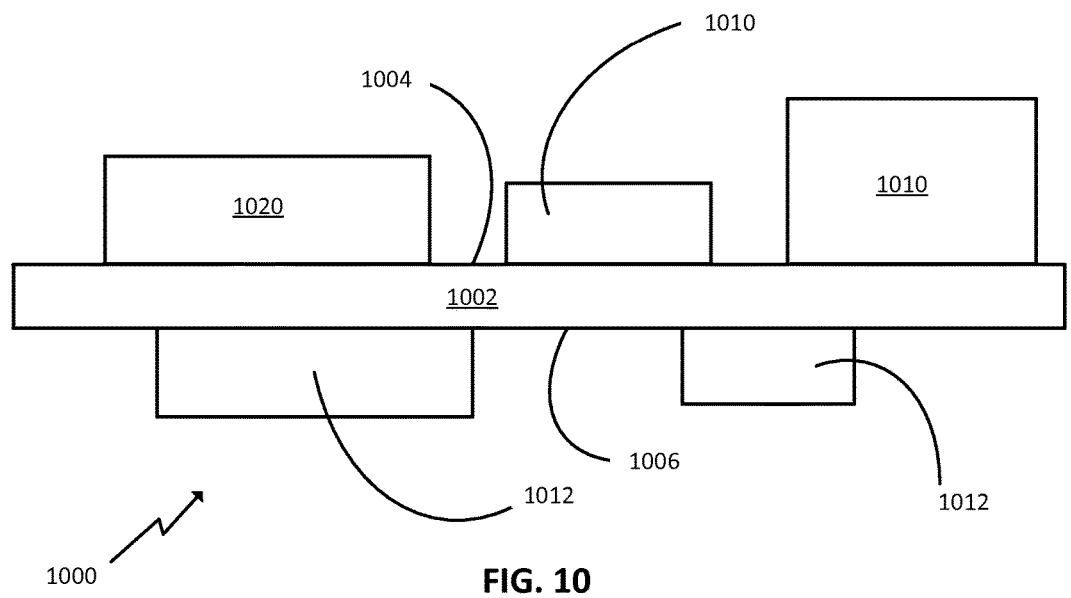
FIG. 10 provides a schematic illustration of a computer system according to an embodiment.

Turning now to FIG. 10, illustrated is an embodiment of a computing system 1000. System 1000 includes a number of components disposed on a mainboard or other circuit board 1002. Board 1002 includes a first side 1004 and an opposing second side 1006, and various components may be disposed on either one or both of the first and second sides. In the illustrated embodiment, computing system 1000 includes an energy storage device 1020 disposed on side 1004, and energy storage device 1020 may comprise any of the embodiments described herein. As an example, energy storage device 1020 can be similar to energy storage device 400 that is shown in FIG. 4.

System 1000 may comprise any type of computing system, such as, for example, a hand-held or mobile computing device (e.g., a cell phone, a smart phone, a mobile internet device, a music player, a tablet computer, a laptop computer, a nettop computer, etc.). However, the disclosed embodiments are not limited to hand-held and other mobile computing devices and these embodiments may find application in other types of computing systems, such as desk-top computers and servers.

Board 1002 may comprise any suitable type of circuit board or other substrate capable of providing electrical communication between one or more of the various components disposed on the board. In one embodiment, for example, board 1002 comprises a printed circuit board (PCB) comprising multiple metal layers separated from one another by a layer of dielectric material and interconnected by electrically conductive vias. Any one or more of the metal layers may be formed in a desired circuit pattern to route—for example in conjunction with other metal layers—electrical signals between the components coupled with board 1002. However, it should be understood that the disclosed embodiments are not limited to the above-described PCB and, further, that board 1002 may comprise any other suitable substrate.

In addition to energy storage device 1020, one or more additional components may be disposed on either one or both sides 1004, 1006 of the board 1002. By way of example, as shown in the figures, components 1010 may be disposed on side 1004 of board 1002, and components 1012 may be disposed on the board's opposing side 1006. Additional components that may be disposed on board 1002 include other IC devices (e.g., processing devices, memory devices, signal processing devices, wireless communication devices, graphics controllers and/or drivers, audio processors and/or controllers, etc.), power delivery components (e.g., a voltage regulator and/or other power management devices, a power supply such as a battery, and/or passive devices such as a capacitor), and one or more user interface devices (e.g., an audio input device, an audio output device, a keypad or other data entry device such as a touch screen display, and/or a graphics display, etc.), as well as any combination of these and/or other devices. In one embodiment, computing system 1000 includes a radiation shield. In a further embodiment, computing system 1000 includes a cooling solution. In yet another embodiment, computing system 1000 includes an antenna. In yet a further embodiment, computing system 1000 may be disposed within a housing or case. Where the board is disposed within a housing, some of the components of computing system 1000—e.g., a user interface device, such as a display or keypad, and/or a power supply, such as a battery—may be electrically coupled with board 1002 (and/or a component disposed on this board) but may be mechanically coupled with the housing. Additional components not physically connected to board 1002 may be in wireless communication with one or more components on board 1002.

Further Example Embodiments

Example 1 is an energy storage device that includes an active material electrode defining a plurality of channels having channel walls, the active material electrode having a surface area that is greater than twice, three times or ten times the surface area of the active material electrode in absence of the channels, the channels having at least two dimensions of at least 1 micron, at least 10 microns or at least 50 microns. An electrically functional substance is adhered to at least a portion of the channel walls, the electrically functional substance selected from at least one of an electrolyte, a conductor and a second active material.

Example 2 includes the subject matter of Example 1 where the device is rigid and has a Young's modulus of greater than 10 GPa, greater than 20 GPa, greater than 50 GPa or greater than 100 GPa.

Example 3 includes the subject matter of any combination of Example 1 or Example 2 wherein the channels have an aspect ratio of greater than or equal to 1:4, greater than or equal to 1:2, greater than or equal to 1:1, greater than or equal to 2:1, greater than or equal to 5:1, greater than or equal to 10:1 or greater than or equal to 25:1.

Example 4 includes the subject matter of any combination of Examples 1-3 wherein the electrically functional substance is contiguous between two or more channels.

Example 5 includes the subject matter of any combination of Examples 1-4 wherein the active material is comprised of $LiCoO_4$, $LiFeO_4$, $LiMnO_2$, $Mg_xMo_3S_4$, $MgMnO_2$, $MgCo_2O_4$, $MnO_2$, $RuO_2$, $Nb_2O_5$ $ZrO_2$, $HfO_2$, $Y_2O_3$, $Al_2O_3$, $Ta_2O_5$ or a conductive polymer or any combination thereof.

Example 6 is a battery that includes the subject matter of any combination of Examples 1-5.

Example 7 is an electrochemical capacitor that includes the subject matter of any combination of Examples 1-5.

Example 8 is an electrolytic capacitor that includes the subject matter of any combination of Examples 1-5.

Example 9 includes the subject matter of any combination of Examples 1-8 wherein the channels are substantially parallel to each other, are equally spaced, are variably spaced, are orthogonal to each other, are formed on opposing sides and/or are formed on adjacent sides of the electrode.

Example 10 includes the subject matter of any combination of Examples 1-9 wherein the energy storage device can include two, three, four or more active material electrodes and the electrodes may be the same or different.

Example 11 is a mobile electronic device that includes a housing, an integrated circuit die within the housing, and an energy storage device within the housing and associated with the integrated circuit die so as to be capable of providing energy to the integrated circuit die, wherein the energy storage device comprises an active material electrode defining a plurality of channels having channel walls, the active material electrode having a surface area that is more than twice the surface area of the active material electrode in absence of the channels, the channels having at least two dimensions of at least 1 micron, and an electrically functional substance adhered to at least a portion of the channel walls, the electrically functional substance selected from at least one of an electrolyte, a conductor and a second active material.

Example 12 includes the subject matter of Example 11 wherein the device has a Young's modulus of greater than 10 GPa, greater than 20 GPa, greater than 50 GPa or greater than 100 GPa.

Example 13 includes the subject matter of any combination of Examples 11 and 12 wherein the channels have an aspect ratio of greater than or equal to 1:4, greater than or equal to 1:2, greater than or equal to 1:1, greater than or equal to 2:1, greater than or equal to 3:1, greater than or equal to 5:1, greater than or equal to 10:1 or greater than or equal to 25:1.

Example 14 includes the subject matter of any combination of Examples 11-13 wherein the electrically functional substance is contiguous between two or more of the plurality of channels.

Example 15 includes the subject matter of any combination of Examples 11-14 wherein the active material is comprised of $LiCoO_4$, $LiFeO_4$, $LiMnO_2$, $Mg_xMo_3S_4$, $MgMnO_2$, $MgCo_2O_4$, $MnO_2$, $RuO_2$, $Nb_2O_5$ $ZrO_2$, $HfO_2$, $Y_2O_3$, $Al_2O_3$, $Ta_2O_5$ or a conductive polymer or any combination thereof.

Example 16 includes the subject matter of any combination of Examples 11-15 wherein the channels may be substantially parallel to each other, may be equally spaced, may be variably spaced, may be orthogonal to each other, may be formed on opposing sides or may be formed on adjacent sides of the electrode.

Example 17 includes the subject matter of any combination of Examples 11-16 wherein the mobile electronic device can include two, three, four or more active material electrodes and the electrodes may be the same or different.

Example 18 is a method of manufacturing an energy storage device, the method comprising etching a plurality of features into an active material substrate, the features having an aspect ratio of greater than 1:1, and coating at least a portion of at least some of the features with an electrically active material selected from an electrolyte and a conductor.

Example 19 includes the subject matter of Example 18 and further comprises coating at least a portion of some features with an electrolyte and coating at least a portion of some features with a conductor.

Example 20 includes the subject matter of any combination of Examples 18 and 19 wherein the energy storage device is a battery.

Example 21 includes the subject matter of any combination of Examples 18-20 further comprising pairing the device with a counter electrode.

Example 22 includes the subject matter of any combination of Examples 18-21 further comprising connecting the energy storage device to a first potential having a first polarity and electrically connecting a second energy storage device to a second potential having a second polarity.

Example 23 includes the subject matter of any combination of Examples 18-22 wherein the electrically active material is an electrolyte and the method includes forming a second electrode in a negative feature coated with electrolyte.

Example 24 includes the subject matter of any combination of Examples 18-23 comprising molding an electrode space in a negative feature using a removable mold.

Example 25 includes the subject matter of Example 24 wherein the mold is positioned in the negative feature during the formation of a gel, polymeric or solid electrolyte.

Although the present disclosure has been presented with reference to specific embodiments, it will be understood by those skilled in the art that various changes may be made without departing from the spirit or scope of the present disclosure. Accordingly, the disclosure of embodiments is intended to be illustrative in nature and is not intended to be limiting. It is intended that the scope of this disclosure shall be limited only to the extent required by the appended claims. For example, to one of ordinary skill in the art, it will be readily apparent that the energy storage device and the related structures and methods discussed herein may be implemented in a variety of embodiments, and that the foregoing discussion of certain of these embodiments does not necessarily represent a complete description of all possible embodiments.

What is claimed is:

1. An energy storage device comprising:
a positive electrode and a negative electrode, each electrode comprising:
a current collector having a solid base and a plurality of solid structures extending from the solid base;
an active material layer including an active material in direct contact with the current collector and having a corresponding plurality of first channels in which the solid structures reside, the active material layer further including a second channel between a given pair of first channels, the active material layer having a surface area between the given pair of first channels that is greater than twice the surface area of the active material layer in absence of the second channel, the second channel having a width and a depth, each of the width and depth of the second channel being less than 1 micron (μm); and
an electrolyte in at least a portion of the second channel; and
a separator that separates the positive electrode from the negative electrode wherein the separator is planar and prevents contact between the positive electrode and negative electrode; wherein no common plane parallel to the planar separator crosses through both a portion of the positive electrode and a portion of the negative electrode.

2. The energy storage device of claim 1 wherein the Young's modulus of the active material of each electrode is greater than 10 gigapascals (GPa).

3. The energy storage device of claim 1 wherein:
the second channel of each electrode exhibits a depth-to-width aspect ratio of greater than 1:1; and
at least one of the width and the depth of the second channel of each electrode is in a range of 10 nanometers (nm)-1 μm.

4. The energy storage device of claim 3 wherein the active material of the positive electrode or negative electrode is selected from one or more of $LiCoO_4$, $LiFeO_4$, or $LiMnO_2$.

5. A battery comprising the energy storage device of claim 1.

6. An electrochemical capacitor comprising the energy storage device of claim 1.

7. An electrolytic capacitor comprising the energy storage device of claim 1.

8. The energy storage device of claim 1 wherein a depth-to-width aspect ratio of each of the given pair of first channels of each electrode is greater than or equal to 10.0.

9. The energy storage device of claim 1 wherein a depth-to-width aspect ratio of the second channel of each electrode is greater than or equal to 10.0.

10. A mobile electronic device comprising:
a housing;
an integrated circuit die within the housing; and
an energy storage device within the housing and capable of providing energy to the integrated circuit die,
wherein the energy storage device comprises:
a positive electrode and a negative electrode, each electrode comprising:
a current collector having a solid base and a plurality of solid posts extending from the solid base;
an active material layer including an active material in direct contact with the current collector and having a corresponding plurality of first channels in which the solid posts reside, the active material layer further including a second channel between a given pair of first channels, the active material layer having a surface area between the given pair of first channels that is greater than twice the surface area of the active material layer in absence of the second channel, the second channel having a width and a depth, each of the width and depth of the second channel being less than 1 micron (μm); and
an electrolyte in at least a portion of the second channel;
wherein each of the given pair of first channels have an average width of less than 100 nanometers (nm); and
a planar separator that physically separates the positive electrode from the negative electrode, but is configured to allow transport of ions between the positive and negative electrodes and wherein no common plane parallel to the planar separator crosses through both a portion of the positive electrode and a portion of the negative electrode.

11. The mobile electronic device of claim 10 wherein the Young's modulus of the active material of each electrode is greater than 10 gigapascals (GPa).

12. The mobile electronic device of claim 10 wherein:
the second channel of each electrode exhibits a depth-to-width aspect ratio of greater than 1:1; and
at least one of the width and the depth of the second channel of each electrode is in a range of 10 nanometers (nm)-1 μm.

13. The mobile electronic device of claim 10 wherein the active material of the positive electrode o negative electrode is selected from one or more of $LiCoO_4$, $LiFeO_4$, and $LiMnO_2$.

14. The mobile electronic device of claim 10 wherein at least one of the width and the depth of the second channel of each electrode is less than 100 nanometers (nm).

15. The mobile electronic device of claim 10 wherein a depth-to-width aspect ratio of the second channel of each electrode is greater than or equal to 10.0.

16. A method of manufacturing an energy storage device, the method comprising:
forming a positive electrode and a negative electrode, each electrode comprising:
a current collector having a solid base and a plurality of solid structures extending from the solid base;
an active material layer including an active material in direct contact with the current collector and having a corresponding plurality of first channels in which the solid structures reside, the active material layer further including a second channel between a given pair of first channels, the active material layer having a surface area between the given pair of first channels that is greater than twice the surface area of the active material layer in absence of the second channel, the second channel having a width and a depth, each of the width and depth of the second channel being less than 1 micron (μm); and
an electrolyte in at least a portion of the second channel; and
forming a separator that separates the positive electrode from the negative electrode wherein the separator is planar and prevents contact between the positive electrode and negative electrode; wherein no common plane parallel to the planar separator crosses through both a portion of the positive electrode and a portion of the negative electrode.

17. The method of claim 16 wherein the active material of each electrode includes lithium.

18. The method of claim 16 wherein the energy storage device is a battery.

19. The energy storage device of claim 1 wherein the second channel of the positive electrode is aligned opposite the second channel of the negative electrode.

20. The energy storage device of claim 1 wherein the active material layer of the positive electrode is different from the active material layer of the negative electrode.

21. The energy storage device of claim 1 wherein the electrolyte of the positive electrode is different from the electrolyte of the negative electrode.

22. The energy storage device of claim 1 wherein the positive and negative electrodes have different structures.

23. The energy storage device of claim 1 wherein the separator physically separates the positive and negative electrodes but is configured to allow transport of ions between the positive and negative electrodes.

* * * * *

UNITED STATES PATENT AND TRADEMARK OFFICE
CERTIFICATE OF CORRECTION

PATENT NO. : 9,947,485 B2
APPLICATION NO. : 13/929224
DATED : April 17, 2018
INVENTOR(S) : Yang Liu et al.

Page 1 of 1

It is certified that error appears in the above-identified patent and that said Letters Patent is hereby corrected as shown below:

In Claim 13, Column 15, Line 14, please replace:
"active material of the positive electrode o negative electrode"
With:
--active material of the positive electrode or negative electrode--

Signed and Sealed this
Twelfth Day of June, 2018

Andrei Iancu
*Director of the United States Patent and Trademark Office*